United States Patent [19]

Boucheron

[11] Patent Number: 5,461,291
[45] Date of Patent: Oct. 24, 1995

[54] VEHICLE SCREEN WIPING CONTROL SYSTEM COMPRISING A CONTROL SIGNAL EMITTER AND A SLAVE RECEIVER

[75] Inventor: Jean-Louis Boucheron, Savigny Le Temple, France

[73] Assignee: Valeo Electronique, Voisins-Le-Bretonneux, France

[21] Appl. No.: 38,159

[22] Filed: Mar. 26, 1993

[30] Foreign Application Priority Data

Mar. 31, 1992 [FR] France ................... 92 03890

[51] Int. Cl.$^6$ .................. B60S 1/04; G08C 19/04
[52] U.S. Cl. ................... 318/443; 318/DIG. 2; 15/250.12; 340/825.78; 341/176; 341/56
[58] Field of Search ................. 318/443, 444, 318/DIG. 2; 15/250.12, 250.13, 250.17; 340/825.77, 825.78; 341/20, 34, 50, 51, 56, 58, 173, 176

[56] References Cited

U.S. PATENT DOCUMENTS

| | | |
|---|---|---|
| 2,058,170 | 10/1936 | Morehouse et al. . |
| 3,080,514 | 3/1963 | Foss et al. ................... 318/29 |
| 4,028,620 | 6/1977 | Kitagawa et al. . |
| 4,340,824 | 7/1982 | Shaw . |
| 4,370,561 | 1/1983 | Briggs .................... 307/9 |
| 4,430,576 | 2/1984 | Fowler . |
| 4,517,909 | 5/1985 | Neki et al. ................ 318/551 X |
| 4,658,150 | 4/1987 | Mizuno et al. . |
| 4,663,575 | 5/1987 | Juzswik et al. ................ 318/444 |
| 4,695,840 | 9/1987 | Darilek . |
| 4,777,378 | 10/1988 | Talbot .................... 200/263 X |
| 4,841,206 | 6/1989 | Orii et al. ................... 388/828 |
| 4,884,070 | 11/1989 | Hannaford ................ 340/825.78 |
| 4,896,084 | 1/1990 | Maue et al. ................ 318/280 |
| 4,939,511 | 7/1990 | Hinckley . |
| 5,008,601 | 4/1991 | Nakamura et al. .......... 318/268 |
| 5,200,676 | 4/1993 | Mueller et al. ............ 318/444 |
| 5,208,582 | 5/1993 | Hwang ................... 340/706 |

FOREIGN PATENT DOCUMENTS

| | | | |
|---|---|---|---|
| 2653279 | 4/1991 | France .............. H03M 7/06 |
| 2506827 | 8/1975 | Germany ........... H04Q 9/06 |

*Primary Examiner*—Bentsu Ro
*Attorney, Agent, or Firm*—Morgan & Finnegan

[57] ABSTRACT

Apparatus, for example vehicle screen wiping apparatus, is controlled by a control system comprising an emitter connected to a slave receiver through a single transmission channel. The emitter is arranged to deliver control or command signals, each of which is represented by a predetermined electrical quantity, so that at least one control signal can be passed along the transmission channel to the receiver connected to the other end of the latter. The receiver activates the electrical load such as the electric motor of the wiping apparatus. The emitter produces a plurality of values of an electrical quantity, representing control or command signals produced by a suitable device such as a switch. These control signals are passed to the slave receiver, via the single transmission channel, and are decoded by the receiver.

4 Claims, 5 Drawing Sheets

VEHICLE SCREEN WIPING CONTROL SYSTEM COMPRISING A CONTROL SIGNAL EMITTER AND A SLAVE RECEIVER

FIELD OF THE INVENTION

The present invention relates in general terms to control systems, of a kind including a control signal emitter connected to a slave receiver.

It also relates to an emitter for delivering control or command signals, in which each control signal is represented by a predetermined electrical quantity (for example, without limitation, a voltage or an impedance), in such a way as to enable a plurality of control signals to be transmitted along a single transmission channel.

The invention further relates to a slave receiver for connection at the downstream end of such a transmission channel.

Further, the invention relates to a vehicle screen wiping apparatus in combination with a control system of the kind mentioned above; and to methods of control, for example methods of controlling such a vehicle screen wiping apparatus.

BACKGROUND OF THE INVENTION

A command or control signal consists of a particular item of information produced by a device for producing control signals, for example a switching device or a potentiometer, which is actuated for example either by a suitable automatic control circuit or manually by an operator.

In a first group of arrangements in the prior art, it is known to produce items of information, for example in binary form, comprising a succession of "0" and "1" bits over a period of time. Such an item of information is represented by a succession of such bits in accordance with a predetermined syntax.

Such apparatus, if it is arranged to be connected to a device for producing control systems for controlling a plurality of loads as in the case of a vehicle, calls for time-based multiplexing, in particular for the purpose of reducing the number of lines constituting the transmission channel. This reduction in the number of lines has become an important goal, due to the cost involved in providing the cumulative length of the wires necessary in conventional arrangements, and also because of the difficulties of forming suitable cable harnesses.

Such a multiplexing device firstly involves the use of a communication protocol which must be created with the aid of specialised circuits. Secondly, it calls for a large number of signal transmission lines. This increases the cost of the transmission function within the vehicle, since the loads are usually located remotely from the control means from which the items of information originate, or remote from the sensors which are required for the purpose of activating the loads or the control means, which may for example be on the fascia of the vehicle.

Finally multiplexing calls for means which are perfectly adapted to the environment of the vehicle, in particular by being insensitive to external perturbations while remaining able to operate even with comparatively large variations in voltage. In this connection, the basic supply voltage is usually provided by the battery of the vehicle, and as is well known, the nominal voltage output of the battery is caused to vary quite considerably, depending on the load imposed on the battery.

These various elements require the multiplexing devices for a vehicle to be relatively costly, and they are characterised by a number of disadvantages.

In another type of arrangement in the prior art, it is known to produce items of information while reducing the number of transmission channels. In those arrangements this is achieved by transmitting the items of information, not in binary form as in the systems mentioned above, but in multi-value forms, that is to say forms in which each unit of information passing along a transmission channel assumes a state which is selected from a plurality of states, which represents an elementary word in a syntax for producing the totality of items of information which are required on the transmission channel.

Such an apparatus requires very precise generation, over the appropriate period of time, of the various events that enable the items of information to be generated. Such an arrangement is again comparatively costly, and is in fact not well adapted to automotive use.

DISCUSSION OF THE INVENTION

An object of the invention is to overcome the drawbacks of prior art arrangements mentioned above.

According to the invention in a first aspect, a command or control signal emitter is characterised in that it includes a controllable generator which produces an electrical quantity, for example a voltage or an impedance, which can assume a plurality of predetermined values, each related to a predetermined control signal produced by a device for producing originating command systems.

According to a preferred feature of the invention, such an emitter, in one form, includes a generator of voltages having predetermined values, such as to produce a plurality of values of the said electrical quantity, the latter comprising the voltage between at least two conductive wires of the transmission channel.

According to a further feature of the invention, the said emitter, in another form, includes a generator for generating a plurality of predetermined values of the electrical impedance, which are measured at the other end of the transmission channel in such a way as to represent a plurality of control signals presented at the input of the emitter.

According to the invention in a second aspect, in a method of control using an emitter according to the invention, at least one control signal is of a dynamic type, the range of values of the said control signal being represented by a range of values of the said electrical quantity associated therewith, with the said values lying between a lower limit, which is greater than the last preceding value of the said electrical quantity, and an upper limit which is smaller than the next following value of the said electrical quantity.

According to the invention in a third aspect, a slave receiver is characterised in that it is connected to a second end of a said transmission channel, and in that it enables the electrical quantity produced by an emitter according to the invention to be decoded, with an output terminal of the emitter being connected to a first end of the transmission channel.

In one form of the invention in this third aspect, the said electrical quantity is a voltage which is present at the second end of the transmission channel, and the said receiver comprises a voltage measuring device adapted for decoding a plurality of control signals entered on the emitter connected to the said first end of the transmission channel.

In another form of the invention in this third aspect, the said electrical quantity is an electrical impedance which is present at the second end of the transmission channel, and the receiver includes an impedance measuring device adapted for decoding a plurality of control signals entered on the emitter connected to the said first end of the transmission channel.

According to the invention in a fourth aspect, a control system for a vehicle screen wiping apparatus is characterised in that it includes an emitter according to the invention in its said first aspect, disposed in a position remote from the screen wiping apparatus, the emitter including a generator for a plurality of predetermined values of an electrical quantity, for example voltage or electrical impedance, the load comprising the screen wiping apparatus itself, with the emitter being connected to a slave receiver in accordance with the invention in its said third aspect, the receiver being connected to the emitter through a transmission channel comprising at least two conductive wires, with its output being connected to a wiping control signal decoder.

According to yet another preferred feature of the invention, such a control system includes an intermittent wipe control signal, and the period of the intermittent wipe control system is represented by a continuous variation in the said electrical quantity representing the intermittent wipe control signal between two limiting values.

According to still another preferred feature of the invention, the emitter activates a plurality of different functions through a plurality of n levels of the said electrical quantity in accordance with a correspondence table in which, for a given level, at least one function changes state and at least one function remains in the inactive state.

Further features and advantages of the present invention will be more clearly understood on a reading of the description of preferred embodiments of the invention which follows, and which is given by way of example only and with reference to the accompanying drawings.

DESCRIPTION OF PREFERRED EMBODIMENTS OF THE INVENTION

Figure 1:
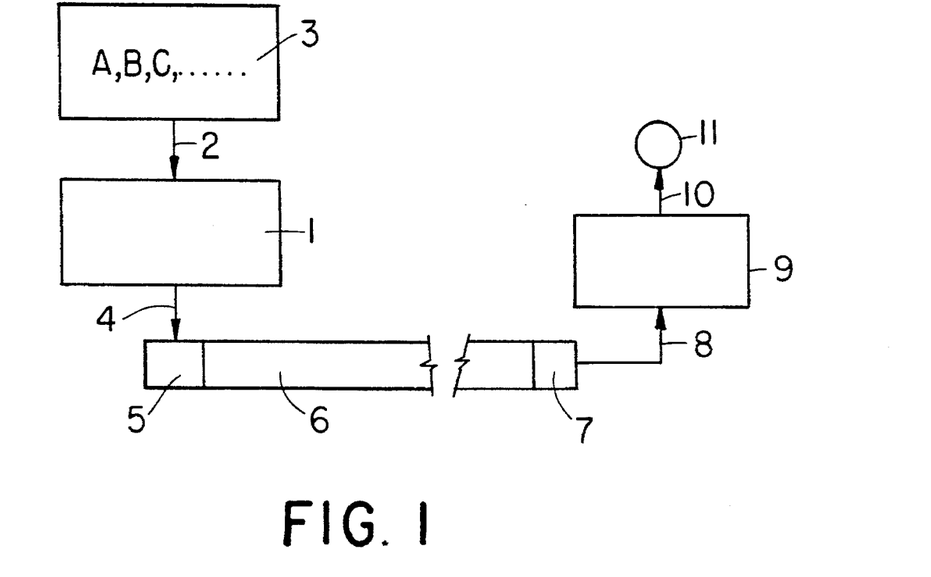
FIG. 1 is a diagram showing the principle of a command or control signal transmitting apparatus comprising an emitter and a slave receiver in accordance with the present invention.

Referring first to FIG. 1, an emitter in a first embodiment of a control system according to the invention comprises a controllable generator 1 for producing an electrical quantity such as voltage or impedance. The generator includes a control input 2, which is connected to a device 3 for producing a control or command signal in the form of at least one item of information A, B, C, so as to generate on the output 4 of the generator 1 the appropriate value of the electrical quantity which corresponds to the control signal.

The generator 1 comprises a means in which the various predetermined values of the electrical quantity are recorded, so that they are then generated when the corresponding control signal is received from the device 3. When the control signal A, B, C etc. is passed to the input 2 of the generator 1, the corresponding value of the electrical quantity concerned is then transmitted to a device 5 giving access to a transmission channel 6.

In one embodiment, the access device 5 is an amplifier, the output of which is connected to a pair of conductive lines of the channel 6. In this way it is possible to provide a uni-polar or bi-polar transmission for the voltage signals representing the items A, B, C of information. It will be noted that the emitter has no clock input, and that for this reason, the information available via the channel 6 directly follows the changes in value of the electrical quantity at the output of the control signal device 3.

The other end of the transmission channel 6 is connected to a slave receiver, which is adapted to receive the value of the electrical quantity, such as voltage or impedance, which has been predetermined on the emitter. The receiver comprises a connecting means 7, through which it is connected to the second or output end of the transmission channel 6. The connecting means 7 may be a simple connector, or an adapting and/or protective amplifier. The output of the connecting means 7 is connected through an input 8 to a decoder 9 of the receiver, for decoding the instant value of the electrical quantity. The output 10 of the decoder 9 transmits a control signal, which is an image of the control or command signal produced by the device 3 of the emitter, to an electrical load 11 which may for example be a motorised system.

Figure 2:
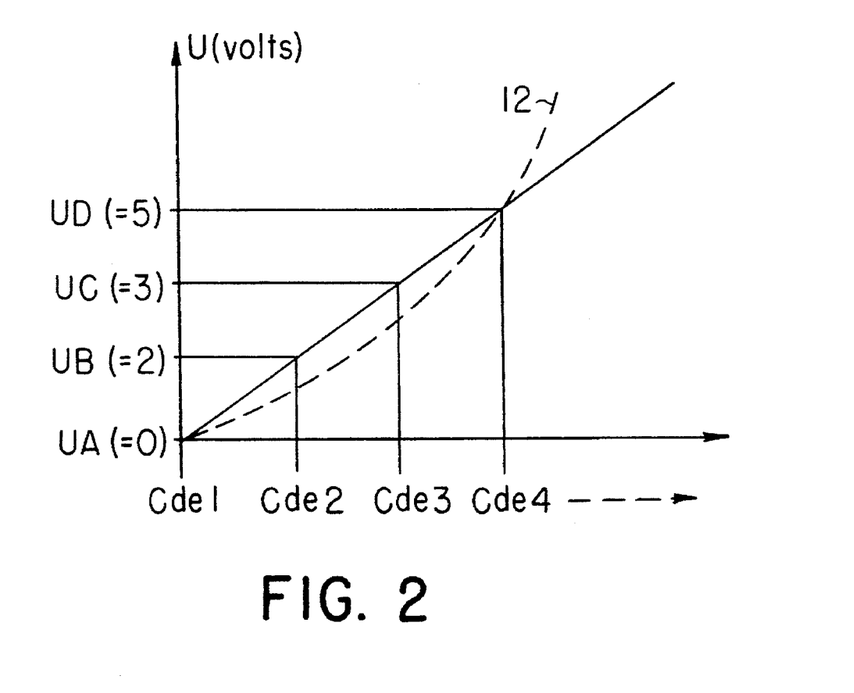
FIG. 2 is a graph showing the relationship between the various command or control signals and the electrical quantity used in the diagram of FIG. 1.

Referring now to FIG. 2, this shows the relationship between a series of control signals C1, C2, C3, C4 etc. to voltage values U, in which UA=0 V, UB=2 V, UC= 3 V, UD=5 V, and so on. In this embodiment, the physical magnitude used is an electrical voltage, the values of which are shown on the ordinate while the control signals C1, C2 etc. are represented on the abscissa.

In FIG. 2 the relationship which is chosen between the items of information and the electrical quantity is linear in shape (represented by a straight line), but particular values have been selected for the voltage which do not correspond to constant intervals. However, in another embodiment, the interval between any two successive voltages on the ordinate axis U is constant.

In a further embodiment, the relationship is represented by a curve 12 (shown as a broken line in FIG. 2), the shape of which is selected as a function of the transmission and/or decoding characteristics on the receiver side. In that case, the corresponding voltage values are altered.

Figure 3A:
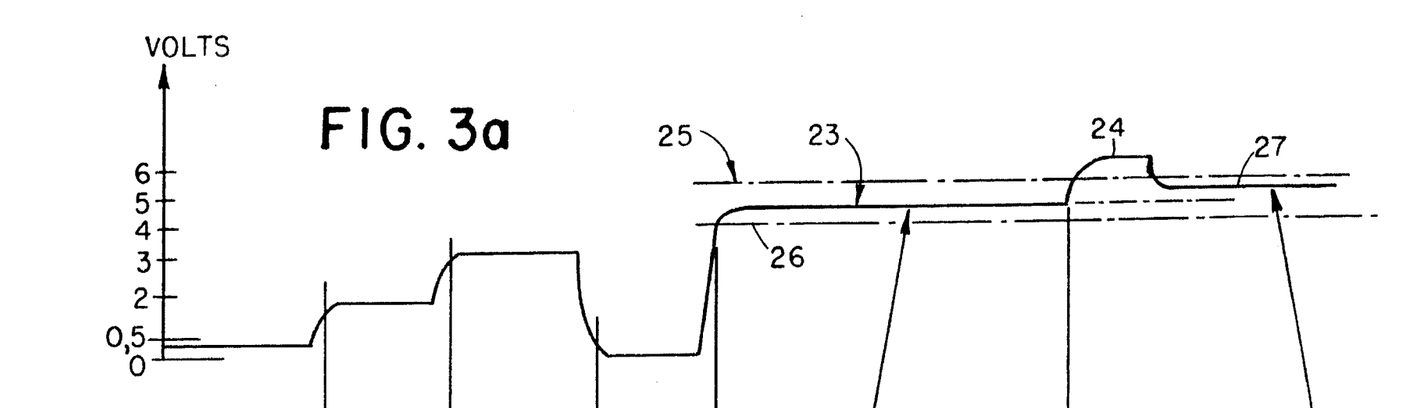
FIG. 3a is a graph showing the progress, with time, of a sequence of variation of an electrical quantity which is passed on the transmission line from an emitter to a slave receiver in a vehicle screen wiping apparatus.
Figure 3B:
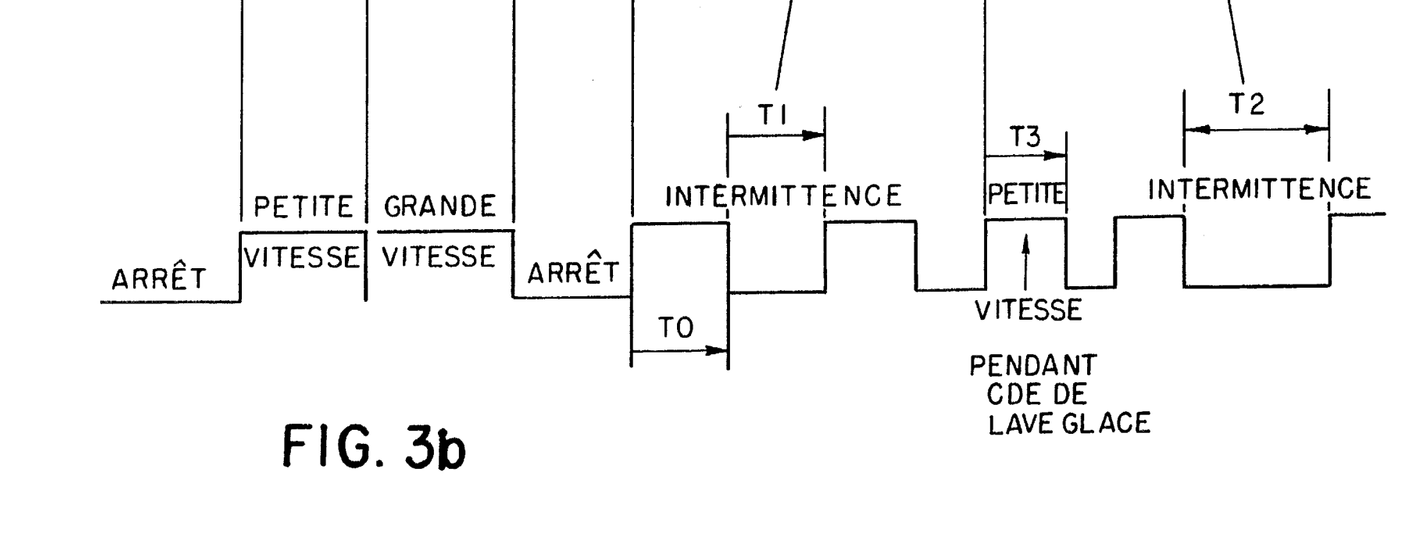
FIG. 3b is another graph, corresponding to FIG. 3a but showing the corresponding decoding sequence for the wiping control signals.

Reference is now made to FIGS. 3a and 3b, which represent one application of the invention to an apparatus for controlling a vehicle screen wiping system by control of voltage level. Such a control apparatus uses five control signals C1 to C5, representing the following five states: system at rest or parked (C1); slow wiping speed (C2); fast wiping speed (C3); intermittent wiping (C4); and wash-wipe control (C5).

In FIG. 3a, the physical quantity generated by the emitter has values which are respectively 0, 2, 3, 5 and 6 volts. The voltage on the transmission channel shows a succession of steps, the voltage level of which represents the value of the electrical quantity that itself represents the control signal being executed. In particular, for the intermittent wipe control signal, the value of the step 23 can be fixed between two limit values, namely a lower and an upper limit value, which are represented by the levels 25 and 26 and which may for example be at ±0.5 volts with respect to the nominal value of the quantity representing the intermittent wipe control signal. This range of values enables two different control signals for the intermittent wiping function to be transmitted, such as to select one of two periods T1 or T2.

FIG. 3b shows the successive control signals carried out by the wiping system which is connected as a load to the receiver of the apparatus. The input of the receiver receives the magnitudes of the voltage shown in FIG. 3a. The wiping system, as shown, starts from the stationary ("at rest") position, which is set at 0 volts.

In practice, in a preferred mode of operation, the level representing the stationary position may fluctuate around the 0 V value without causing the load to be applied on receipt of the next control signal.

This enables the system to be made insensitive to parasitic voltages which may, in particular, be present in the transmission channel. In FIG. 3a, this permitted fluctuation is ±0.5 V.

The wiping system then passes to its slow speed mode, followed by the fast speed mode, after which it returns to the stationary position for an indeterminate period of time, followed eventually by entry into an intermittent wiping phase. In this phase, the wiping apparatus is energised for a period T0, after which it returns to the stationary position. This cycle is repeated with a cycle period T1, as is indicated in the Figure, this period being set, as described above, by selection of the appropriate voltage level, between the levels 25 and 26, of the intermittent wiping control signal.

The wiping system then receives a wash-wipe control signal through a voltage step 24 (FIG. 3a) at the 6 V level. Here, the wiping system is programmed in such a way as to pass to non-intermittent wiping, for example at its slow speed, either so long as the wash-wipe control signal is activated, or for a predetermined period of time T3 starting with the initiation of the wash-wipe control signal.

In the example of the wiping sequence shown, the wiping system subsequently returns to its intermittent wiping phase, but the value of the intermittence period has assumed the value T2 (which is greater than T1), because the selected voltage which is detected on the transmission channel has increased as indicated by the step 27 in FIG. 3a.

Figure 4:
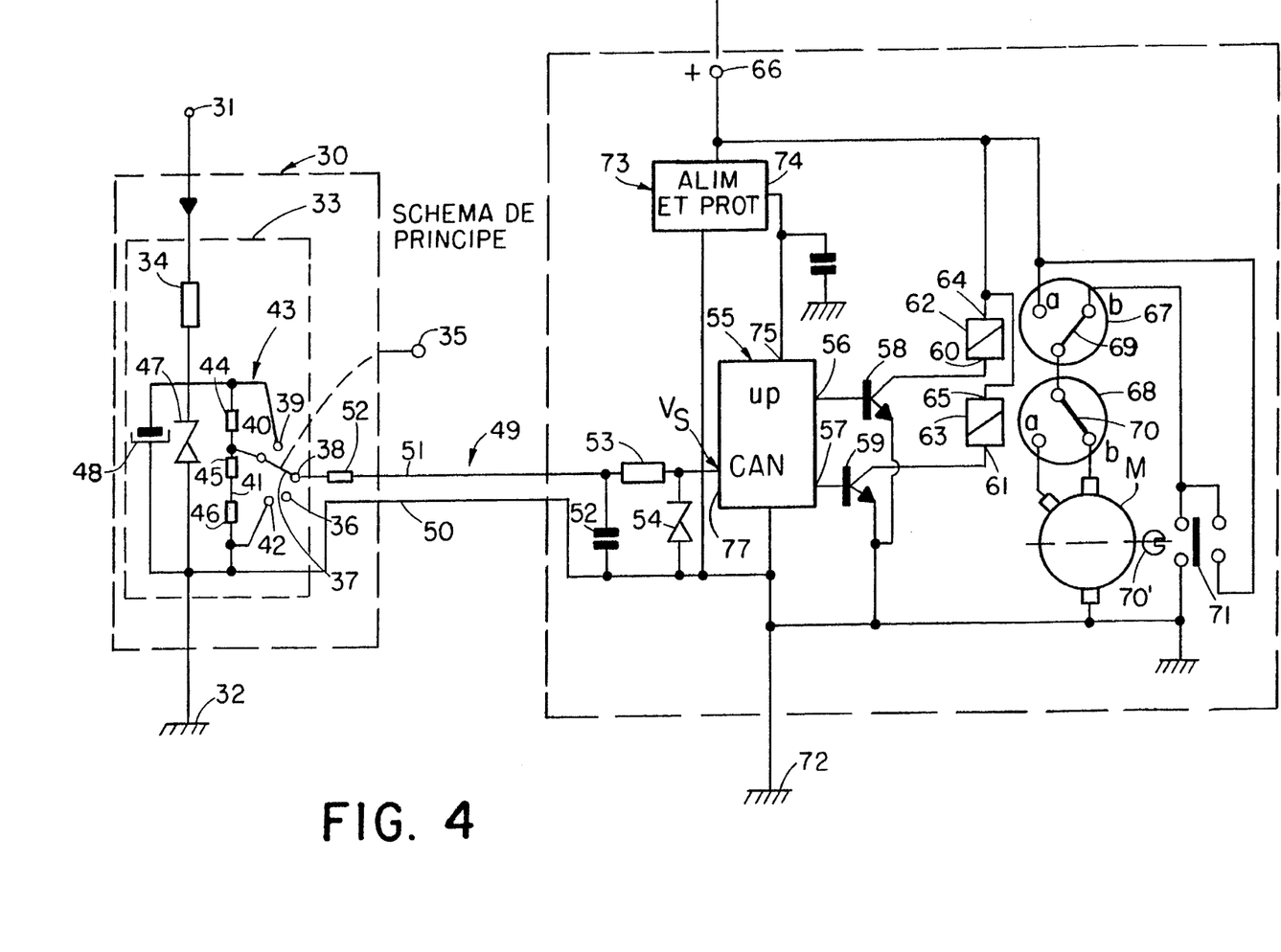
FIG. 4 is a circuit diagram showing one embodiment of a control system for a vehicle screen wiping apparatus in accordance with the present invention.

Reference is now made to FIG. 4, which shows a complete system comprising the control apparatus in one form according to the invention, connected to a screen wiping system. In FIG. 4, the emitter 30 is supplied by the battery between a terminal 31 connected to the positive terminal of the battery and a terminal 32, which is connected to the negative terminal of the battery or to ground in the vehicle.

The emitter also comprises a generator 33, which consists mainly of a resistor 34 connected in series with a circuit for modulation in response to a signal at an input 35. This signal may for example consist in the manual actuation of a switch 36, which may typically be arranged on the fascia of the vehicle. In this example this switch has a movable finger 37 which connects a terminal 38 selectively with one of the terminals 39, 40, 41 or 42 of the switch 36. The respective terminals 39 to 42 are connected to the corresponding terminals of a divider bridge 43, which comprises resistors 45 and 46 in series with a resistor 44. In addition, the divider bridge 43 is connected in parallel with a Zener diode 47 and with a high value capacitor 48. The parallel circuit comprising the divider bridge 43, Zener diode 47 and capacitor 48 is connected to the other terminal of the resistor 34 and also to the negative terminal 32 of the emitter.

In addition, the common point between the negative terminal 32 and the parallel circuit 43, 47, 48 is connected to a first wire 50 of the transmission channel 49. The second wire 59 of the latter is connected to an input device 152 mounted within the emitter 30. This input device comprises a protective resistor, and in one embodiment a Zener diode may be connected in series with this resistor 152.

In addition, the corresponding end of the transmission channel 49 is connected to the actuating means for the screen wiping system itself. The latter mainly comprises a slave receiver which includes a connecting device having a filter circuit. This filter circuit comprises a capacitor 52, a resistor 53 and a Zener diode 54. The output from the filter circuit 52 to 54 is connected to the analog to digital conversion inlet port of a microcontroller 55. This microcontroller is of a type which is currently used in most control systems for screen wiping apparatus, for the purpose of running prerecorded control sequences, and also for receiving on analog input ports a limited number of measurements; these measurements may be derived, for example, from a humidity sensor or a sensor of wiper position and/or velocity of wiping movement. For this reason, the system here described does not require any significant addition to existing apparatus of the kind which merely performs the wiping function itself.

The microcontroller 55 includes two main logic outputs, 56 and 57, which control two transistors, 58 and 59 respectively. The power outputs of these transistors are connected to first terminals 60 and 61 respectively of analog relays or interruptors 62 and 63 respectively. The other input terminals, 64 and 65 respectively, of the relays 62 and 63 are connected in common to a positive supply terminal 66.

In addition, the dual relay device 62, 63 has interruptors indicated at 67 and 68 respectively. These are twin-pole interruptors, the movable fingers of which, indicated at 69 and 70 respectively, make contact in the positions indicated respectively at "a" and "b" on each of the two relays. In particular, the position of the relays 67 and 68 at "b" corresponds to the stop control signal; the position "a" on the relay 67 alone corresponds to the slow speed control signal; and the position "a" occurring on both relays 67 and 68 corresponds to the fast speed control signal. Finally, in the known manner, the drive motor M for the screen wiper includes on the output of its shaft, which may drive a mechanical reduction gear, a sensor 701 for sensing stopping (blocking), so as to control a suitable safety cut-out switch 71.

The microcontroller 55 is supplied with power from the terminal 66 through a terminal 72 which is connected to ground or to the negative terminal of the battery, and which is protected by a regulated supply and over-voltage protection circuit 73 in the known manner. The circuit 73 has an output 74 which is connected to the positive voltage input 75 of the microcontroller 55.

The microcontroller contains, in a preprogrammed memory, a program for decoding values of the voltage $V_S$ which are present on its analog input port 77. This voltage $V_S$ represents the magnitude in relation to the item of information, or command signal, delivered by the emitter 30 via the transmission channel 49. The various control signals (or commands) can be decoded accordingly, for example in the manner described above with reference to FIGS. 3a and 3b.

It should be noted that the command or control signal for starting the screen wash pump of the wiping apparatus is not shown, but it is within the competence of the person skilled in this technical field to provide this additional feature. The analog output port (not shown) for controlling the screen wash pump is activated by the microcontroller, in particular as a function of the value $V_S$ on its input port 77.

It will be noted that the line 50 is also connected to the common ground terminal 72. This ensures a good voltage reference.

Figure 5:
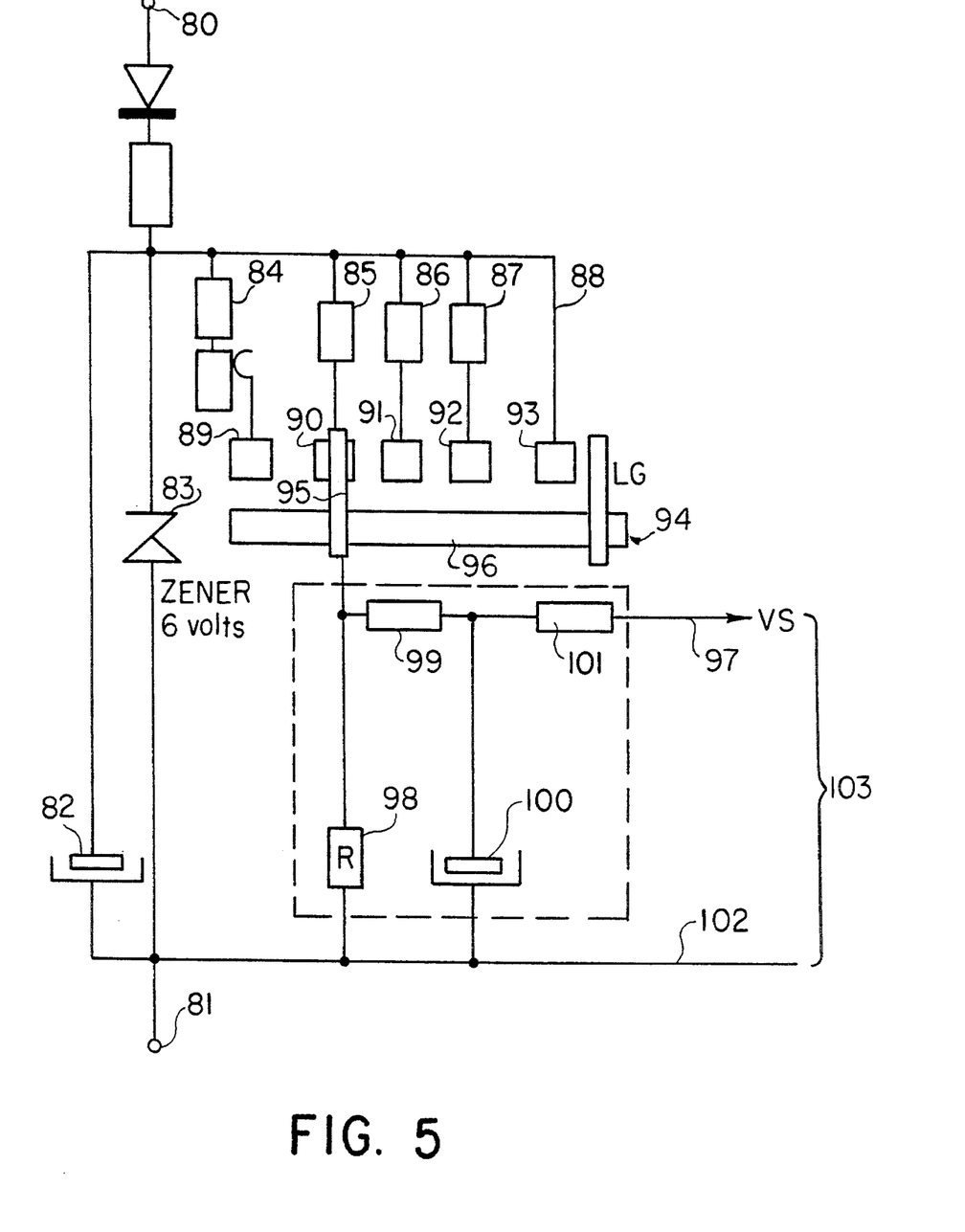
FIG. 5 is a block diagram showing another embodiment, being a generator for the control system for a screen wiping apparatus in accordance with the invention.

Referring now to FIG. 5, this shows another embodiment which enables certain problems of weakening or of parasitic effects on the emitter 30 to be overcome. In this particular embodiment, the emitter is connected between a positive supply terminal 80 connected to a battery, and a negative supply terminal 81 which is connected either to the battery or to ground in the vehicle. Here again there is a parallel circuit comprising a first capacitor 82 and a Zener reference diode 83. In a preferred form of this embodiment, the Zener diode sets the maximum value, for example 6 volts, of the voltage which is available on the transmission channel. In particular, the magnitudes of the voltage representing the items of information transmitted, and/or the combination of the latter, are limited in this way to 6 volts.

The parallel circuit also comprises a network of parallel resistors indicated in FIG. 5 at 84, 85, 86 and 87. These resistors are also connected to contact pads 89, 90, 91, 92, 93 respectively of a contactor 94. The contactor 94 has a movable finger 95 which is operated manually or by any other means, and which controls the relationship between the contact pad and a contact strip 96. The contact strip 96 is connected to a network which acts as an input device for the transmission line 97. This input network comprises a first resistor 98 which is connected to a filter comprising a resistor 99 and a capacitor 100. The output side of this filter is connected on a first side of a further resistor 101, the other side of which is connected to the transmission line 97 of the transmission channel 103. In addition, the other line, 102, which is also connected to the terminal 81 for connection to ground or negative potential as the case may be, forms part of the transmission channel 103.

Figure 6:
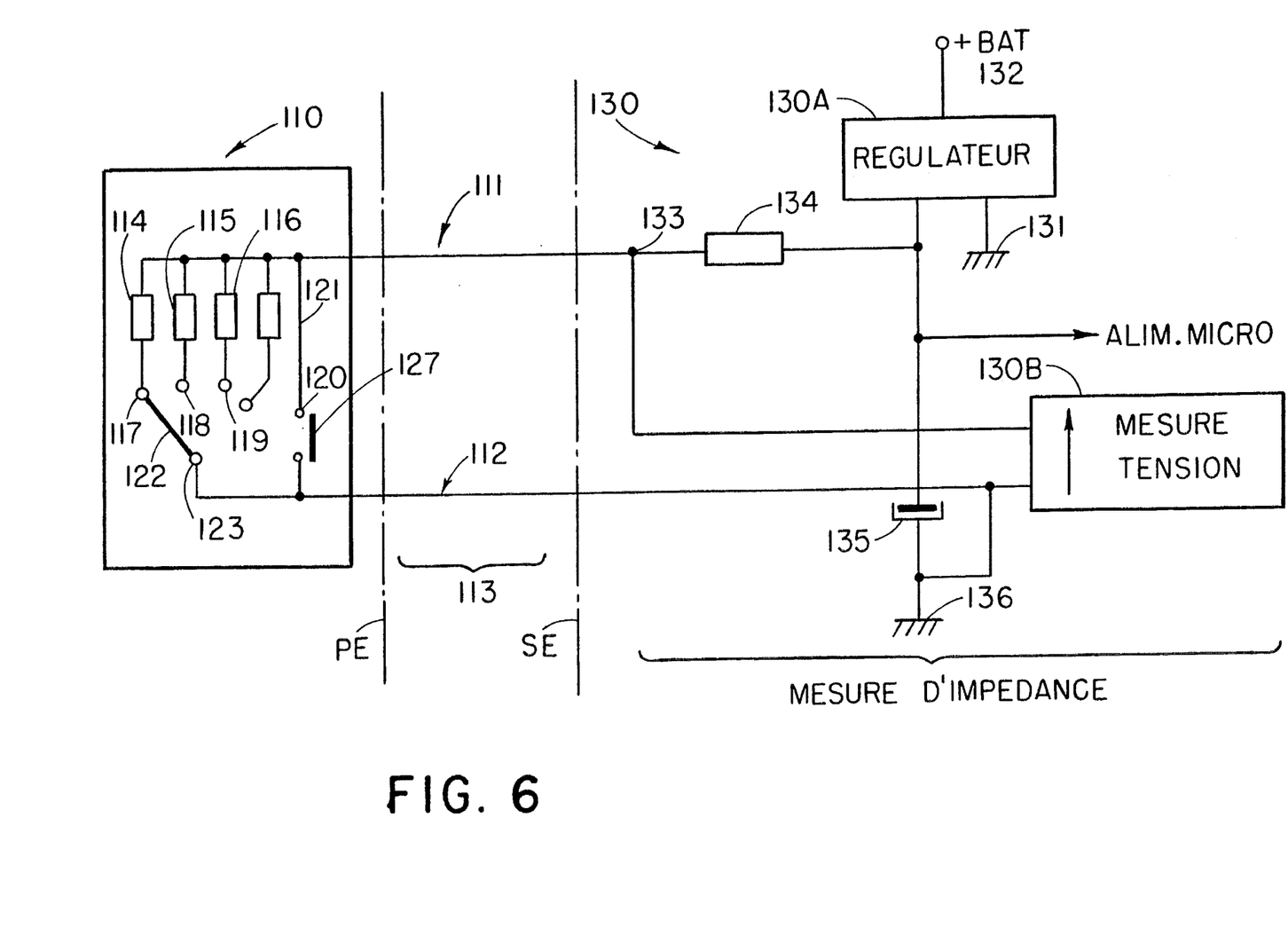
FIG. 6 is a further diagram showing yet another embodiment of an apparatus in accordance with the present invention comprising an emitter and a receiver.

Reference is now made to FIG. 6, in which a modified form of transmission means is shown. In FIG. 6 this transmission means includes an emitter, a transmission channel, and a receiver which is arranged according to a second embodiment of the invention. The emitter, here indicated at 110, is connected through a twin wire connection, consisting of a first line 111 and a second line 112 so as to constitute the communication or transmission channel, 113.

The emitter 110 in this example is arranged to produce an impedance corresponding to an item of information and/or a combination of such items. To this end, in the embodiment shown in FIG. 6, the impedance-producing circuit of the emitter includes resistors indicated at 114, 115 and 116, which are connected in common, on one side, to the line 111. The other side of the resistors 114 to 116 is connected to contact pads 117, 118 and 119 respectively of a contactor or switch which also has a further contact pad 120. This contact pad 120 is directly connected to the line 111 through a wire 121. The contactor also has a movable finger 122 which is operable manually by the operator of the system, or by any other means, for example a preprogrammed analog device. The common point 123 of the movable finger 122 is connected to the line 112 which constitutes the second line of the transmission channel 113. This common point 123 is also connected to the wire 121 through an interruptor 127. In this way it is possible to short circuit the device, so as to enable a priority command to be applied if necessary.

The receiver, 130, comprises a supply circuit 130A, which may be arranged as a voltage regulator. This circuit is connected between local ground and/or the negative terminal 131 of the battery, and the terminal 132 which is connected to the positive terminal of the battery.

The line 111 of the transmission channel is connected to the point 133 which is common to a circuit comprising a resistor 134 and a capacitor 135. This enables a voltage to be supplied and set, this voltage being determined by the value supplied by the control position of the emitter. In addition, the second line 112 is connected to a common point 136 at local ground potential. The measuring point is connected to the input 133 of the receiver 130, which receives a voltage representing the impedance (or resistance) seen by the receiver and produced by the emitter 110. In this way, it is also possible to decode another electrical quantity, different from the electrical voltage as has been described above, in such a way that the various items of information applied on the emitter 110 can be recomposed at will.

This impedance measuring device essentially includes a measuring voltage generator, for example the regulator 130A and a voltage measuring circuit 130B. The regulator 130A may be reduced to one Zener diode, and the voltage measured by the circuit 130B is that which is present between the two lines 111 and 112 at the second end SE of the transmission channel 113. For this reason the emitter 110, which is connected to the first end PE of the channel 113, produces impedances or resistances the values of which represent control or command signals. The output, not shown, of the voltage measuring circuit 130B is connected to a circuit for decoding the transmitted command signals. In the application described here, this decoding circuit consists directly of the microcontroller of the screen wiping system, arranged substantially as described above with reference to FIG. 4.

In a further modified embodiment, not shown in the drawings, the transmission channel is connected to a plurality of electrical loads, each of which receives a sequence of commands appropriate to it. In that case, the separate functions may exist together by defining a plurality of n levels of the transmitted electrical quantity. A correspondence table is then used, such that, for a given level of the chosen electrical quantity, only those functions which are immediately concerned are able to change state, with the others remaining out of service or inactive.

Similarly, the invention does not exclude the possibility of two loads being connected to two separate transmission channels, especially if they are coded identically in terms of values of the physical quantity concerned.

What is claimed is:

1. A screen wiper signal transmitting apparatus comprising:

a screen wiping apparatus;

a controllable generator for producing electrical impedances in various predetermined values, with each value representing a respective one of a plurality of predetermined screen wiping control signals;

a control signal means connected to the controllable generator for initiating said screen wiping control signals;

a transmission channel having a first end connected to the controllable generator and a second end;

a screen wiping signal decoder connected to said second end of the transmission channel, where the decoder responds to said predetermined values of electrical impedances, said decoder decoding said predetermined values of impedance in order to represent a respective one of said plurality of screen wiping control signals to regulate the screen wiping apparatus.

2. A screen wiper control signal transmitting apparatus comprising:

a screen wiping apparatus;

a controllable generator for producing at an output terminal a plurality of screen wiping electrical impedances in various predetermined values, with each value representing a predetermined one of a plurality of screen wiping control signals;

a control signal means connected to the controllable generator for initiating said screen wiping control signals;

a transmission channel having a first end connected to said controllable generator output terminal and a second end;

a screen wiping slave receiver connected to said second end of the transmission channel for decoding the electrical impedances present at the second end of the transmission channel, the screen wiping slave receiver having means for decoding a plurality of said electrical impedances applied to said first end of the transmission channel in order to regulate the screen wiping apparatus.

3. A control signal apparatus comprising a controllable generator having an output terminal for producing electrical quantities in various predetermined values, with each said value representing a predetermined control signal, a control signal means connected to the controllable generator for initiating said control signals, a transmission channel having a first end connected to said controllable generator output terminal and a second end, a slave receiver connected to said second end of the transmission channel for decoding the electrical quantities, screen wiping apparatus for a vehicle and a control system for said screen wiping apparatus, said controllable generator being disposed in a position remote from the screen wiping apparatus and the slave receiver connected to the screen wiping apparatus, the screen wiping apparatus being adjacent to the slave receiver and constituting a load for the slave receiver, the transmission channel having at least two conductive wires, the slave receiver having a decoder for decoding wipe control signals and connected to the output of the transmission channel, the controllable generator having means for generating said various predetermined values of electrical quantities representing said wipe control signals, including means for generating an intermittent wipe control signal, defining a period of said control signal represented by a continuous variation of the electrical quantity representing the intermittent wipe control signal between two limiting values.

4. A control signal transmitting apparatus for a screen wiping apparatus comprising a controllable generator for producing electrical impedances in various predetermined values, with each said value representing a respective one of a plurality of predetermined control signals, a control signal means connected to the controllable generator for initiating said control signals, a transmission channel having a first end connected to the controllable generator and a second end, a decoder connected to said second end of the transmission channel, wherein the decoder responds to said predetermined values of electrical impedances, said decoder decoding said predetermined values of impedances in order to represent a respective one of said plurality of control signals, said decoder having a Zener diode to establish a measuring voltage generator and a voltage measuring circuit for measuring signals on said transmission channel second end that correspond to said control signals in order to regulate the screen wiping apparatus.

* * * * *